April 2, 1957  A. Y. DODGE  2,787,355
SINGLE REVOLUTION CLUTCHES
Filed June 5, 1952
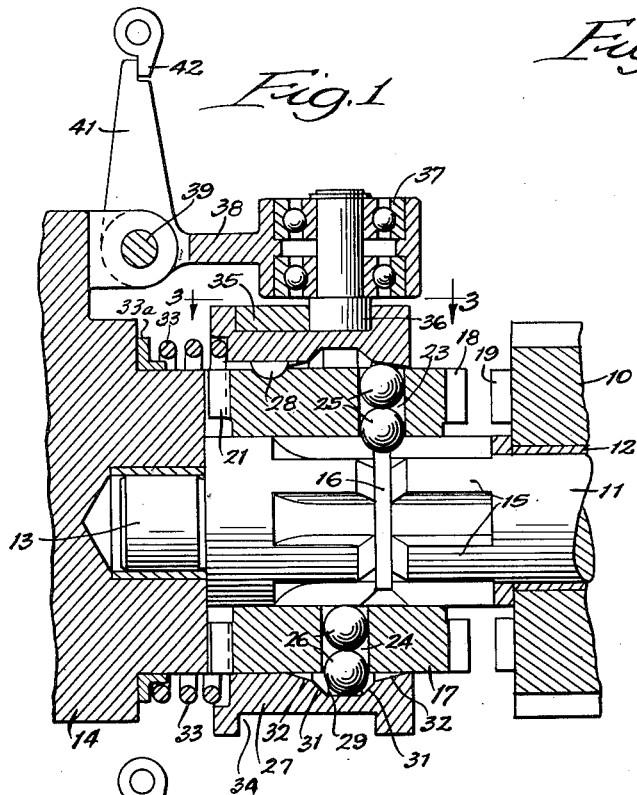
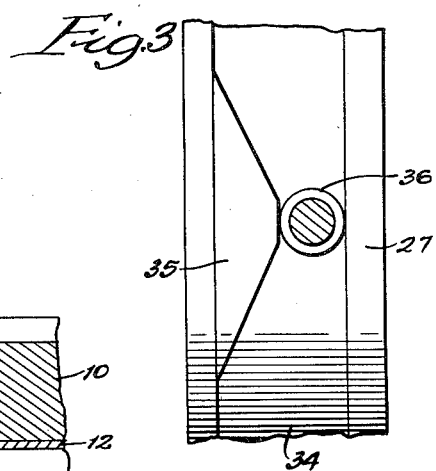
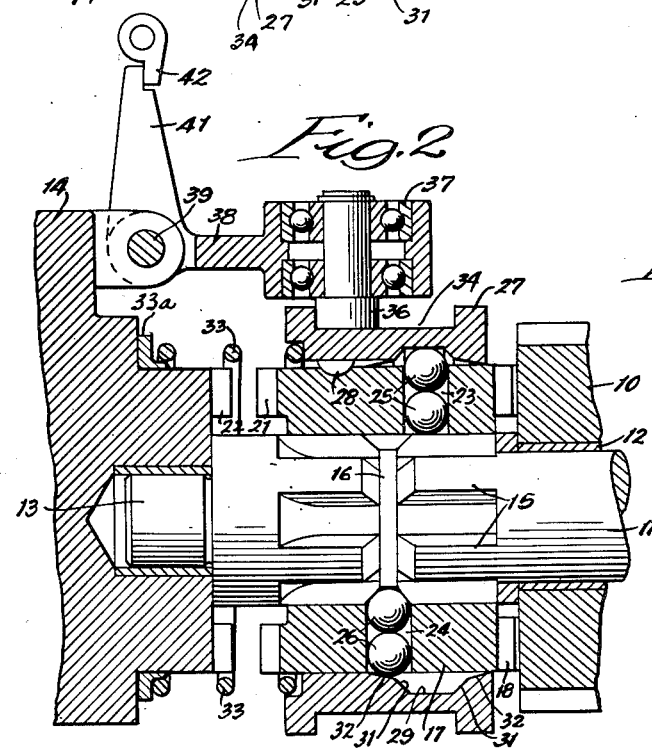
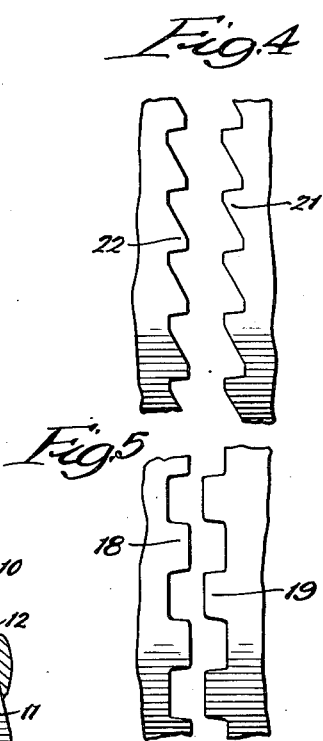
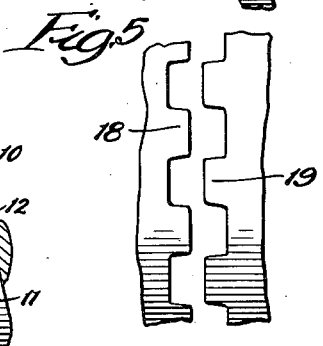
INVENTOR:
Adiel Y. Dodge,
BY
E. S. Booth
ATTORNEY.

2,787,355
Patented Apr. 2, 1957

2,787,355
SINGLE REVOLUTION CLUTCHES
Adiel Y. Dodge, Rockford, Ill.

Application June 5, 1952, Serial No. 291,949

2 Claims. (Cl. 192—33)

This invention relates to single revolution clutches and more particularly to a positive mechanical clutch which can be easily released and engaged for single revolution operation.

It is one of the objects of the invention to provide a single revolution clutch which is simple in construction, positive in operation and which can be easily engaged and disengaged under load for easy control.

Another object is to provide a single revolution clutch of the tooth type in which the teeth are positively held in engagement through a small controlling or operating force.

A further object is to provide a single revolution clutch in which the driven member is positively held against rotation when the clutch is disengaged.

The above and other objects and advantages of the invention will be more readily apparent when viewed in connection with the accompanying drawing in which:

Figure 1 is an axial section through a single revolution clutch embodying the invention, showing the clutch in disengaged position;

Figure 2 is a view similar to Figure 1 showing the clutch in engaged position;

Figure 3 is a partial section on the line 3—3 of Figure 1 showing the cam control;

Figure 4 is a partial elevation showing a developed view of the stationary locking teeth and Figure 5 is a similar view of the driving teeth.

The clutch as shown is adapted to connect a driving member indicated as a gear 10 to a driven member shown as a shaft 11. The driving gear 10 may be rotatably mounted on the shaft 11 on a bearing 12 and the shaft may be journaled at one end as indicated at 13 in a stationary part 14.

The shaft 11 is formed near its end with a series of splines 15 which are interrupted by an annular groove to define recesses 16 in the spline teeth.

A sleeve 17 is mounted on the shaft 15 for axial sliding movement thereon and is formed on its intermediate surface with splines cooperating with the splines 16 to hold the sleeve against rotation relative to the shaft. At one end the sleeve 17 is formed with a series of driving teeth 18 to mesh with complementary teeth 19 on the driving gear. As shown in Figure 5 the teeth 18 and 19 may be formed with sloping sides to provide an ejection angle and may have rounded corners so that they can move into engagement with each other easily, even under load conditions which produce relative rotation. With this construction the gaps between the tips of the teeth are larger than the tips of the teeth so that the teeth will move easily together into full mesh and can easily be disengaged from each other due to the ejection angle even when they are transmitting heavy loads.

At its opposite end the sleeve 17 is formed with locking teeth 21 to engage complementary locking teeth 22 on the fixed part 14. The locking teeth may be shaped as best seen in Figure 4 so that they will engage readily in one direction of relative rotation and will hold the parts against rotation relative to each other in such direction when they are engaged. Since the driving member normally rotates in only one direction, teeth of this sort are preferred for use as the locking teeth although if reverse rotation is contemplated the locking teeth might be constructed like the teeth 18 and 19.

To hold the sleeve in either of its axially shifted positions the sleeve is formed with two sets of openings 23 and 24 extending radially therethrough and spaced axially relative to each other along the sleeve. Each of the openings receives coupling elements shown as pairs of balls 25 and 26 respectively which have a total radial depth greater than the radial thickness of the sleeve. The balls are adapted to move into the recesses 16 when the sleeve is shifted to hold it locked in its shifted position and when they are out of the recesses, function as connector members through which the sleeve is moved. For shifting the sleeve a cam collar 27 is mounted thereon for axial sliding movement and is preferably held against rotation relative thereto by a key 28. On its interior the collar is formed with a groove 29 terminating at its opposite sides in cam surfaces 31 which preferably lie at a relatively large angle to the axis of the shaft. Beyond the cam surfaces 31 are locking surfaces 32 lying at a substantially smaller angle relative to the shaft axis. The groove 29 is of sufficient depth to receive the balls when they are out of the recesses 16 and the cam surfaces are so positioned that when they engage the balls they will cam them inward into the recesses. When the clutch is in its disengaged position as shown in Figure 1 the collar 27 is moved to the left and the balls 26 act as coupling elements to move the sleeve 17 to the left with the collar. The cam surfaces at the right side of the groove engage the balls 25 and cam them inward into the recesses 16 so that the sleeve is held in its extreme left position with the clutch teeth 21 and 22 in engagement. Thus the sleeve and the shaft 11 are held against rotation. When the collar is shifted to the right as shown in Figure 2 the balls 25 act as coupling elements to shift the sleeve 17 to the right and the balls 26 are cammed into the recesses 16 to lock the collar in position against accidentally shifting. At this time the teeth 18 and 19 are engaged to connect the driving gear 10 to the sleeve and through the splines to the driven shaft 11.

To control the clutch for single revolution operation a spring 33 is provided acting between the collar and a thrust washer 33a rotatable on the fixed part 14 to urge the collar to the right and engage the clutch. To shift the collar to the left to disengage the clutch collar is formed in its outer surfaces with a cam groove 34 formed at one point in its circumference with an axially extending rise 35. It will be understood that if disengagement is desired after a fraction of a revolution less than a full revolution more than one rise 35 can be employed and that where reference is made to a single revolution clutch herein, it is contemplated that the clutch might be designed to disengage after a fraction less than a whole revolution.

The cam is adapted to be engaged by a rotatable cam follower 36 carried in bearings 37 by the free end of a lever 38 which is pivoted at 39 on the fixed part 14. The lever preferably has an extension 41 which may be engaged by an operating member such as a rotatable finger 42 to swing the lever up to its cam disengaging position. When the lever is swung counterclockwise the follower 36 will move radially out of the cam groove 34 to release the collar for shifting to the right under the influence of the spring 33. At this time the sleeve 17 will be shifted to the right to its clutch engaging position as shown in Figure 2. In this position the driving gear 10 turns the sleeve, the driven shaft and the collar. As soon as the collar has been released by the cam follower the lever may again swing inward to the position shown in Figure 1 wherein the follower 36 will ride in the groove 34 shown in Figure 2. As the collar turns the follower will engage the cam rise 35 and will shift the collar to the left as shown in Figure 1 to disengage the driving teeth and to engage the locking teeth. It will be noted that only a relatively small force is required to move the collar in either direction due to the ejection angles on the teeth and that the teeth are locked solidly in engagement even under very high torque loads through the locking balls and the cam surfaces on the collar. Thus, the clutch can be easily controlled without requiring high control forces and will function to engage rapidly when the collar is released and to disengage positively after a predetermined movement in response to the cam.

While one embodiment of the invention has been shown and described in detail herein, it will be understood that this is illustrative only and is not to be taken as a definition of the scope of the invention, reference being had for this purpose to the appended claims.

What is claimed is:

1. A single revolution clutch comprising rotatable driving and driven members one of which is a shaft, a sleeve axially slidable on the shaft and secured against rotation relative thereto, clutch teeth on both ends of the sleeve, clutch teeth on the other of said members to engage the clutch teeth on one end of the sleeve when the sleeve is shifted axially in one direction, a fixed part having clutch teeth thereon to engage the clutch teeth on the other end of the sleeve when the sleeve is shifted axially in the other direction, said clutch teeth having engaging surfaces at an acute angle to the shaft axis so that they tend to disengage in response to torque the sleeve having two sets of openings therethrough, recesses in the shaft to register with one set of openings when the sleeve is shifted in one direction and with the other set of openings when the sleeve is shifted in the other direction, actuating and locking elements slidable in the openings to enter the recesses and hold the sleeve against axial movement, a collar shiftable axially on the sleeve and formed with spaced internal cam surfaces to engage the sets of actuating and locking elements respectively and cam them inward, a spring urging the collar in said one direction, a cam groove in the outer surface of the collar formed with at least one axially extending rise, and a cam follower fixed against axial movement fitting in the cam groove to engage the rise and urge the collar in said other direction.

2. A single revolution clutch comprising rotatable driving and driven members one of which is a shaft, a sleeve axially slidable on the shaft and secured against rotation relative thereto, clutch teeth on both ends of the sleeve, clutch teeth on the other of said members to engage the clutch teeth on one end of the sleeve when the sleeve is shifted axially in one direction, a fixed part having clutch teeth thereon to engage the clutch teeth on the other end of the sleeve when the sleeve is shifted axially in the other direction, said clutch teeth having engaging surfaces at an acute angle to the shaft axis so that they tend to disengage in response to torque the sleeve having two sets of openings therethrough, recesses in the shaft to register with one set of openings when the sleeve is shifted in one direction and with the other set of openings when the sleeve is shifted in the other direction, actuating and locking elements slidable in the openings to enter the recesses and hold the sleeve against axial movement, a collar shiftable axially on the sleeve and formed with spaced internal cam surfaces to engage the sets of actuating and locking elements respectively and cam them inward, a spring urging the collar in said one direction, a cam groove in the outer surface of the collar formed with at least one axially extending rise, a lever pivoted adjacent the collar for movement of its free end radially toward and away from the collar, and a cam follower on the free end of the lever to fit in the cam groove and engage the rise thereby to shift the collar in said other direction.

References Cited in the file of this patent

UNITED STATES PATENTS

| 86,613 | Aichele | May 19, 1919 |
| 1,310,629 | Newsom | July 22, 1919 |
| 2,101,366 | Frank | Dec. 7, 1937 |
| 2,259,149 | Cederstrom | Oct. 14, 1941 |

FOREIGN PATENTS

| 408,608 | Italy | June 4, 1945 |
| 437,958 | Italy | July 20, 1948 |
| 399,942 | Great Britain | Oct. 19, 1933 |
| 650,958 | Great Britain | Dec. 29, 1947 |